(12) United States Patent
Mossoba et al.

(10) Patent No.: US 11,019,039 B2
(45) Date of Patent: May 25, 2021

(54) SYSTEMS AND METHODS FOR ENCODED COMMUNICATIONS

(71) Applicant: Capital One Services, LLC, McLean, VA (US)

(72) Inventors: Michael Mossoba, Arlington, VA (US); Joshua Edwards, Philadelphia, PA (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 113 days.

(21) Appl. No.: 16/280,606

(22) Filed: Feb. 20, 2019

(65) Prior Publication Data

US 2020/0053053 A1     Feb. 13, 2020

Related U.S. Application Data

(63) Continuation of application No. 16/058,470, filed on Aug. 8, 2018, now Pat. No. 10,250,574.

(51) Int. Cl.
| | |
|---|---|
| *G06F 21/00* | (2013.01) |
| *G06F 3/01* | (2006.01) |
| *G06F 16/33* | (2019.01) |
| *H04L 29/06* | (2006.01) |
| *G06N 5/02* | (2006.01) |
| *G06Q 10/06* | (2012.01) |
| *G06F 21/62* | (2013.01) |
| *G06F 16/248* | (2019.01) |
| *G06F 16/9535* | (2019.01) |

(52) U.S. Cl.
CPC ........ *H04L 63/0428* (2013.01); *G06F 16/248* (2019.01); *G06F 16/9535* (2019.01); *G06F 21/6245* (2013.01); *G06N 5/02* (2013.01); *G06Q 10/067* (2013.01); *H04L 63/083* (2013.01); *H04L 63/0876* (2013.01)

(58) Field of Classification Search
CPC ................. H04L 63/0428; G06F 21/6245
See application file for complete search history.

(56) References Cited

U.S. PATENT DOCUMENTS

| | | | |
|---|---|---|---|
| 6,885,734 B1* | 4/2005 | Eberle ................ | H04M 3/4938 379/88.01 |
| 10,419,934 B1* | 9/2019 | Sapunaru ............. | H04W 12/06 |
| 2009/0083548 A1 | 3/2009 | Dettinger et al. | |

(Continued)

*Primary Examiner* — Alexander Lagor
(74) *Attorney, Agent, or Firm* — DLA Piper LLP US (57) ABSTRACT

Systems and methods for encoded communications are disclosed. In some embodiments, a server system may be configured to receive a communication from a user interface at an encoded communication module that includes an artificial intelligence based natural language processing module, determine whether the received communication is an encoded communication, decode the encoded communication to generate a financial query when it is determined that the received communication is an encoded communication, retrieve financial data associated with the user, determine an answer to the financial query based on the retrieved financial data, encode the determined answer to generate an encoded responsive communication, and transmit the generated encoded responsive communication to the user interface for providing to a user of the user interface.

20 Claims, 6 Drawing Sheets

---

Receive a communication from a user interface at an encoded communication module including an artificial intelligence based natural language processing module. 201

Determine whether the received communication is an encoded communication. 203

Generate a financial query when it is determined that the received communication is an encoded communication and providing the financial query to a query response module. 205

Determine a response to the financial query and provide the determined response to the encoded communication module. 207

Encode the response to the financial query to generate an encoded responsive communication. 209

Transmit the generated encoded responsive communication to the user interface for presentation to a user of the user interface. 211

(56) References Cited

U.S. PATENT DOCUMENTS

2014/0101139 A1* 4/2014 Gemert ................ G06Q 10/10
  707/722
2017/0024742 A1   1/2017 Khan et al.
2018/0375986 A1* 12/2018 Blanco ................ H04M 1/7255

* cited by examiner

SYSTEMS AND METHODS FOR ENCODED COMMUNICATIONS

CROSS-REFERENCE TO RELATED APPLICATIONS

This is a continuation of U.S. application Ser. No. 16/058,470, filed Aug. 8, 2018, the content of which is hereby incorporated by reference in its entirety.

TECHNICAL FIELD

The present disclosure is directed towards encoded communications.

BACKGROUND

Conventional systems for communication may not be able to secure communications provided to a user via a user device. For example, when at a crowded airport or at a bar with friends, a user may not want others to know they are accessing sensitive information such as checking the balance of a financial account, conducting sensitive health, legal, financial activities, and the like. In conventional systems, anyone who overhears the conversation, or sees the mobile application on the user device may be able to determine not only that a sensitive communication is taking place, but also the sensitive information that is transmitted during the communication.

SUMMARY

In order to secure communications provided to a user via a user device, the systems and methods described herein may encode communications between a user and a server system such that the information provided via the user device may be intelligible only by the user of the user device. Moreover, in some embodiments, the information provided via the user interface may appear unintelligible to non-users of the user device.

Conventional systems used for the communication of sensitive information include mobile banking applications, banking websites, credit card dial-in services, health portals, and the like. These conventional systems do not include a mechanism for securing information that is provided to the user via a user device. In other words, the conventional systems do not prevent others (i.e., non-users) from viewing, hearing or otherwise accessing the sensitive information when it is provided to the user device. For example, in conventional banking mobile applications, a person sitting next to a user may be able to view the interface on a mobile device and determine the user's account balance.

In some embodiments, the systems and methods described herein may secure information that is provided to the user via a user device by encoding the communications. Encoded communications, as referred to herein, may include communications between two parties (e.g., user device and server system), that are coded such that they are understandable by each of the two parties but not understandable by others. For example, the encoded communications may include text messages, messages on a mobile application, emails, automated phone prompts, and the like. In some embodiments, the described systems and methods include an encoded communication module of a server system that includes an artificial intelligence based natural language processing module that is configured to receive communications from a user interface, determine whether the received communication is an encoded communication, generate a query that is dependent on sensitive information, determine a response to the query containing sensitive information, encode a response to the query and transmit, by the server system, the generated encoded responsive communication to the user interface for presentation to the user of the user device. As only an encoded responsive communication is provided to the user interface for presentation to the user of the user device, the systems and methods described herein are able to secure information that is provided to the user device and prevent non-users from viewing, hearing, and/or otherwise accessing sensitive information.

Accordingly, in some embodiments, the systems and methods described herein provide the benefit of allowing users to use their user devices, mobile applications, and the like to access sensitive information in areas where it would not conventionally be secure (i.e., restaurants, bars, airports, public transportation, etc.). In some embodiments, using the systems and methods described herein, a user may be able to check the balance of a credit card, or to see if the user's paycheck has been deposited. In other words the user may be provided with information that may better inform the user's spending habits. For example, if a user is able to covertly check their account balance using the provided systems and methods, the user may elect to opt-out of ordering another round of drinks at a bar.

In some embodiments, a method may include the steps of receiving, by an encoded communication module of a server system, a communication from a user interface, wherein the encoded communication module further comprises an artificial intelligence based natural language processing module, determining, by the encoded communication module, whether the received communication is an encoded communication, generating, by the encoded communication module, a financial query when it is determined that the received communication is an encoded communication and providing the financial query to a query response module, determining, by the query response module, a response to the financial query and providing the determined response to the encoded communication module, encoding, by the encoded communication module, the response to the financial query to generate an encoded responsive communication, and transmitting, by the server system, the generated encoded responsive communication to the user interface for presentation to a user of the user interface.

Determining whether the received communication is an encoded communication may include determining a semantic representation of the received communication, and matching the semantic representation to at least one user designated query stored in a database coupled to the server system. Generating the financial query further may include matching the at least one user designated query to an associated financial query stored in the database.

In some embodiments, determining the response to the financial query may include retrieving user financial data, and generating the response to the financial query based on the retrieved user financial data. Retrieving user financial data may include retrieving user financial data from one or more financial services databases remote from the server system via a financial information application interface. In some embodiments, the method may also include the step of generating, by the encoded communication module, a non-responsive encoded communication in response to the received communication from the user interface when it is determined that the received communication is not an encoded communication. In some embodiments, the method may include authenticating at least one of the user device and the user of the user device by verification of data provided to the server system against user authentication data stored in a database, where the user authentication data further comprises at least one of a password, an encoded password, a phrase, an encoded phrase, a question, an encoded question, a series of communications, an encoded series of communications, a pin, a phone number corresponding to where the communication is received from, an email address that the communication is received from, a social media account the communication is received from, and a phone line at which the user communication is received. The method may also include the steps of receiving, by the server system, user preferences from the user interface, and storing the user preferences on a database communicatively coupled to the server system, wherein at least one of determining whether the received communication is an encoded communication, generating the financial query, and encoding the response to the financial query is based at least in part on the stored user preferences. Additionally, the financial query may include at least one of a balance query, a transaction status query, a credit score query, a card status query, a loan status query, credit limit query, and a rewards query.

In some embodiments, a system for encoded communication may include a processor, and non-volatile memory storing computer program code. The computer program code when executed on the processor may cause the processor to execute a process operable to receive a communication from a user interface at an encoded communication module that further comprises an artificial intelligence based natural language processing module, determine whether the received communication is an encoded communication, decode the encoded communication to generate a financial query when it is determined that the received communication is an encoded communication, retrieve financial data associated with the user, determine an answer to the financial query based on the retrieved financial data, encode the determined answer to generate an encoded responsive communication, and transmit the generated encoded responsive communication to the user interface for providing to a user of the user interface.

In some embodiments, when determining whether the received communication is an encoded communication, the processor may be further configured to determine a semantic representation of the received communication, and match the semantic representation to at least one user designated query stored in a database coupled to the server system. In some embodiments, when generating the financial query, the processor is further configured to match the at least one user designated query to an associated financial query stored in the database. In some embodiments, when determining a response to the financial query, the processor is further configured to retrieve user financial data, and generate a response to the financial query based on the retrieved user financial data. In some embodiments, the processor may be configured to generate, by the encoded communication module, a non-responsive encoded communication in response to the received communication from the user interface when it is determined that the received communication is not an encoded communication. The processor may also be configured to authenticate at least one of the user device and the user of the user device by verification of data provided to the processor against user authentication data stored in a database, wherein the user authentication data further comprises at least one of a password, an encoded password, a phrase, an encoded phrase, a question, an encoded question, a series of communications, an encoded series of communications, a pin, a phone number corresponding to where the communication is received from, and a phone line at which the communication is received. In some embodiments, the user interface is configured to receive from and transmit to the processor, at least one of text based and audio based communications.

In some embodiments, the user interface is configured to transmit user preferences to the processor, and the processor is further configured to receive the transmitted user preferences, and store the user preferences on a database communicatively coupled to the server system, wherein at least one of determines whether the received communication is an encoded communication, generates the financial query, and encodes the response to the financial query is based at least in part on the stored user preferences. The financial query may include at least one of a balance query, a transaction status query, a credit score query, a card status query, a loan status query, a credit limit query, and a rewards query.

In some embodiments, systems and methods described herein include a user device having a display, an input device, a processor in communication with the display and the input device, and a non-transitory memory in communication with the processor, the memory storing instructions that, when executed by the processor, cause the processor to perform processing including: sending a communication from a user of the user device to a server system communicatively coupled with the user device, wherein the communication is associated with a financial query, receiving, from the server system, a responsive communication from the user interface responsive to the communication, wherein the responsive communication is associated with an answer to the financial query and generated using an artificial intelligence based natural language processing module, and displaying on the display of the user device, the responsive communication.

The user device may be configured to display on the display of the user device, one or more user preference prompts related to user preferences, receive user preferences from the input device responsive to the displayed one or more user preference prompts, and transmit by the user preferences to a database communicatively coupled to the server system. The responsive communication may be generated at least in part based on the user preferences.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The systems and methods described herein may secure information (e.g., sensitive information) that is provided to the user via the user device by using encoded communications.

Sensitive information may include financial information, health information, legal information and the like. For example, the systems and methods described herein may be used for sensitive health information such as test results. The systems and methods described herein may also be used to check the status of legal proceedings such as family court proceedings, divorce status, foster care status, and trial information. Further, the systems and methods described herein may be used to covertly obtain financial information such as credit scores, rewards, payment completion, sufficient funds, restricted accounts, budgets, check deposits, transaction clearing, transaction pending, negotiations and the like.

In some embodiments, the systems and methods described herein may be embodied on a text messaging application, a messaging platform, email, an automated phone-line, and the like. For example, in some embodiments, a user may text an encoded message to a phone number associated with a server system where the encoded message is a query for sensitive information. The server system may decode the message, determine a response to the query, encode the determined response, and provide the encoded response to the user device for display on the text messaging application. In this example, the communication between the user and the server system may appear to be unrelated to the sensitive information but at the same time convey the sensitive information to the user of the user device. For example, the communication may appear to be a conversation regarding the weather, birthdays, and other topics.

Figure 1:
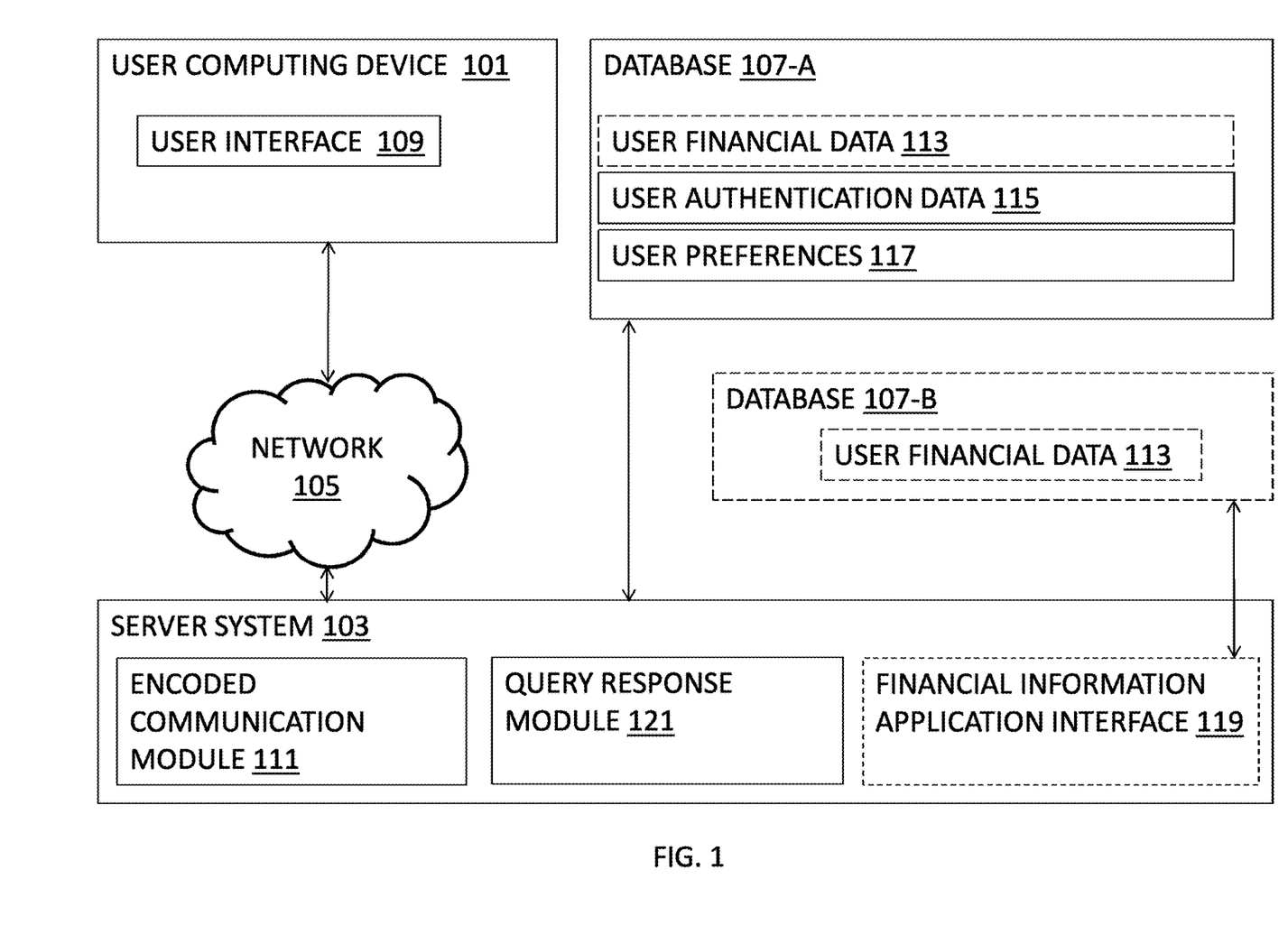
FIG. 1 illustrates a system for encoded communication in accordance with an aspect of the present disclosure.
Figure 2:
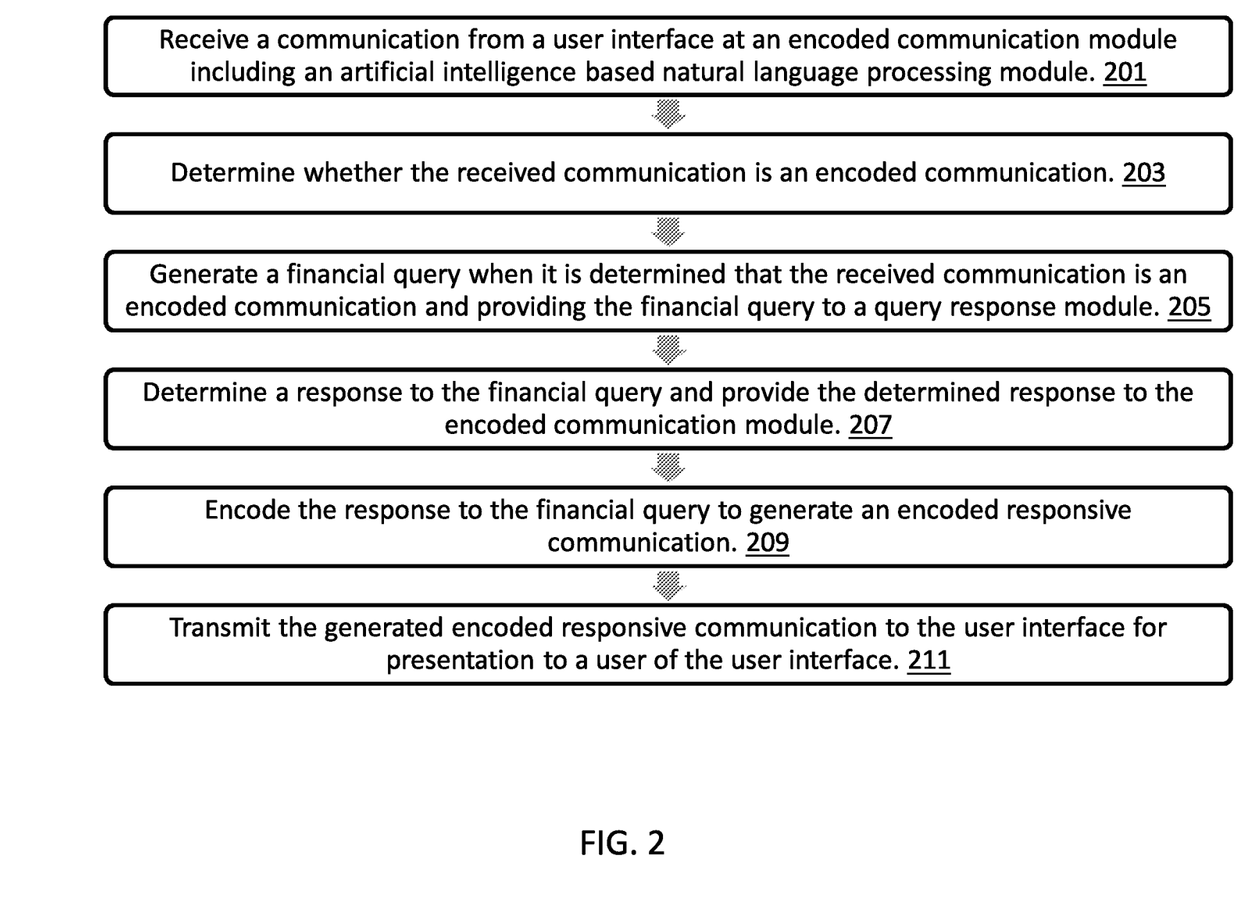
FIG. 2 illustrates a process for encoded communication in accordance with an aspect of the present disclosure.

FIGS. 1-2 illustrate examples for systems and processes where the encoded communications are for sensitive information such as financial queries.

FIG. 1 illustrates a system for encoded communication in accordance with an aspect of the present disclosure. As illustrated in FIG. 1, a user computing device 101 including a user interface 109 may be communicatively coupled to a server system 103 via a network 105.

The user interface 109 may be a software application or a website on user computing device 101 such as a mobile device, tablet, laptop, desktop, computing system or the like. In some embodiments, the user interface 109 may be a text-messaging application. In some embodiments, the server system 103 may be configured to receive an audio communication, a text communication, an email communication and the like from the user interface 109. The received communications may be transcribed into a text communication that is capable of further processing by the server system 103.

The network 105 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

The server system 103 may be configured to receive a communication from a user interface 109 and provide the user interface 109 with a generated encoded responsive communication for presentation on the user interface 109. The server system 103 may include an encoded communication module 111, a query response module 121, and optionally, a financial information application interface 119.

The encoded communication module 111 may include an artificial intelligence based natural language processing module. In some embodiments, the encoded communication module 111 may be configured to determine whether a communication received by the server system 103 is an encoded communication, generate a financial query when it is determined that the received communication is an encoded communication and provide the financial query to the query response module 121. The encoded communication module 111 may be further configured to encode the response to the financial query in order to generate an encoded responsive communication. The query response module 121 may be configured to determine a response to a financial query and provide the determined response to the encoded communication module 111. Determining a response to the financial query may include retrieving financial data associated with a user and determining an answer to the financial query based on the retrieved financial data. The financial data may be retrieved via the optional financial information interface 119. Additionally, the financial data may be retrieved from a database 107-A, 107-B.

The optional financial information application interface 119 may be communicatively coupled to a database 107-B that is configured to store user financial data 113. In some embodiments, the database 107-B may be linked to one or more financial providers and organizations (e.g., credit card companies, banks, etc.).

The server system 103 may also be communicatively coupled to a database 107-A. The database 107-A may be configured to store user authentication data 115, and user preferences 117. Optionally, the database 107-A may also be configured to store user financial data 113.

In some embodiments, the database 107-A, and/or database 107-B may be configured to be initiated, or populated from information received from the user via the user interface 109, financial institutions, and the like. For example, in some embodiments, the user may provide the server system 103 with user authentication data 115 and/or user preferences 117 that may be stored in database 107-A.

User authentication data 115 may include user profile data such as usernames, user password, user pins, cell phone number, subscriber identity module (SIM) card information, and other information the user may have to provide to the server system 103 during a conversation in order to receive communications containing sensitive information. The user authentication data 115 may also include at least one of a password, an encoded password, a phrase, an encoded phrase, a question, an encoded question, a series of communications, an encoded series of communications, a pin, a phone number corresponding to where the communication is received from, and a phone line at which the user communication is received.

User preferences 117 may include a mapping between one or more user designated queries and associated queries for sensitive information retrieval (e.g., financial queries). As will be discussed further below, the user preferences 117 may be used to determine whether a received communication is an encoded communication, to generate the financial query, and to encode responses to sensitive queries.

User preferences 117 may include user designated queries. User designated queries may be questions or statements that correspond to a sensitive query but appear to be unrelated to a sensitive query (e.g., financial query). Example user designated queries may include questions or statements about the weather, ages, etc. For example, user designated queries may include "What's the weather like today?", "Is it raining hard?", "Is Tim older than John?", and "Did you call your mom today?"

In some embodiments, a user may be presented with pre-configured, default or a template of user designated queries, where each of the user designated queries may correspond to common sensitive queries (i.e., common financial queries). The pre-configured, default, or template collection of user designated queries may be edited by a user using the user interface 109.

In some embodiments, a user may be able to enter their own user designated queries and set related financial queries. A mapping between a user designated query and a financial query may be stored as a user preference 117.

In some embodiments, a user may be able to configure the system such that a series of user designated queries may correspond to a series of related financial queries. A series of user designated queries may correspond to a series of thresholds and help convey information regarding the financial balance of an account. For example the user designated query "Is it pouring?" may correspond to the financial query "Is my balance less than $100?" and the user designated query: "Was it pouring all day?" may correspond to the financial query "Is my balance less than $50?" In some embodiments, user designated queries and their related financial queries may be stored as user preferences 117 in database 107-A.

In some embodiments, the encoded communication module 111 may include an artificial intelligence based natural language processing module that is trained prior to its use by a system for encoded communications. The artificial intelligence based natural language processing module may be trained such that it is able to determine whether a received communication is a match for a user designated query. In other words, the artificial intelligence based natural language processing module may be trained to determine whether a received input corresponds to a user designated query even if the received input varies from the user designated query in terms of syntax, form, punctuation, spelling, and the like. For example, the artificial intelligence based natural language processing module may be trained such that it can determine the meaning or concept associated with a received input and the encoded communication module 111 may be configured to match the determined meaning or concept with the user designated queries.

FIG. 2 illustrates a process for encoded communication in accordance with an aspect of the present disclosure. At step 201, a server system 103 may receive a communication from a user interface 109 at an encoded communication module 111 including an artificial intelligence based natural language processing module. At step 203, the server system 103 may determine whether the received communication is an encoded communication. At step 205, the server system 103 may generate a financial query when it is determined that the received communication is an encoded communication and provide the financial query to a query response module 121. At step 207, the server system 103 may determine a response to the financial query and provide the determined response to the encoded communication module 111. At step 209, the server system 103 may encode the response to the financial query to generate an encoded responsive communication. At step 211, the server system 103 may transmit the generated encoded responsive communication to the user interface 109 for presentation to a user of the user interface 109.

Determining whether the received communication is an encoded communication at step 203 may involve authenticating a user and/or user device. The user device and/or the user of the user device may be authenticated by verifying data provided to the server system 103 against the user authentication data 115 stored in database 107-A. For example, the server system 103 may check whether a communication is being received at a designated text channel from its corresponding telephone number. In another example, authentication may involve monitoring the received communication to determine whether the user is providing the server system 103 with a pin, password, username, encoded password, phrase, question, and the like. Authentication may also involve checking the email address a communication is received from, and/or a social media account that the communication is received from.

In some embodiments, the described systems and methods may provide improved authentication and security when compared to conventional systems. For example, in some embodiments, the user may be required to provide a password or a pin during the conversation, but also be communicating with the server system 103 from a pre-established phone number. Further, the user may also be required to know what the proper encoded communications are before being presented with encoded sensitive information.

Determining whether the received communication is an encoded communication at step 203 may also involve determining a semantic representation of the received communication and matching the semantic representation to at least one user designated query stored in a database coupled to the server system 103.

For example, in some embodiments the artificial intelligence based natural language processing module of the encoded communication module 111 may be configured to apply natural language processing to a received communication in order to determine the underlying user designated query contained within the received communication. For example, although a user may type "what's the weather today?" or "Hey, what's the weather like today?" which would appear to be different (due to the varying punctuation, language, number of words, and the like) in conventional systems, the artificial intelligence based natural language processing module is trained such that it is capable of determining that the two user designated queries have the same meaning, and are identical for the purposes of mapping. For example, the artificial intelligence based natural language processing module may screen the received communication for typographical mistakes, punctuation mistakes, capitalization mistakes, and/or common synonyms to determine the semantic meaning of the received communication. In some embodiments, the artificial intelligence based natural processing module of the encoded communication module 111 may utilize a machine learning approach to decipher the meaning of the received communication. For example, the encoded communication module 111 may have an artificial intelligence based natural language processing module that is trained on queries provided by the user. During training a user may enter a series of entries having similar meaning: "Hey, what's the weather like today?" "Is it sunny today?," and "Is it nice out today?" Each of the entries may map to a single user designated query.

In comparison to conventional systems, which may require a direct match between the received user input and the queries, the artificial intelligence based natural language processing module may apply a set of rules to the received communication to determine whether the received communication is an encoded communication. In other words, the artificial intelligence based natural language processing module may determine whether two user designated queries have the same meaning. The artificial intelligence based natural language processing module may be configured to determine common meanings between received communications to match them to a user designated query in view of typographical mistakes, punctuation, capitalization, and synonyms.

In some embodiments, the artificial intelligence based natural language processing module may receive a communication and determine the semantic meaning for the received communication. In some embodiments, this may include determining a confidence threshold indicating the artificial intelligence based natural language processing module's confidence in the received communication having the same meaning as a user designated query. The artificial intelligence based natural language processing module may be trained by the user providing the module a collection of user designated queries having the same meaning, or asking user designated queries in multiple different ways. In some embodiments, the artificial intelligence based natural language processing module may generate a vector including a representation for each word in the user designated query, and it may be determined that user designated queries have the same meaning based on the vector trajectory for the words in the user designated query.

In some embodiments, if it is determined at step 203 that the received communication is an encoded communication the systems and methods described herein may proceed to step 205, where a financial query is generated and provided to a query response module 121. Alternatively, if it is determined at step 203, that the received communication is not an encoded communication (e.g., there is no match between the received communication and any of the stored user designated queries), the system may be configured to generate a non-responsive encoded communication, and provide the generated non-responsive encoded communication to the user interface 109. For example, if the query "Hey man, what's up?" is not a match to an encoded communication, the system may generate a non-responsive encoded communication such as "Not much. How're you?" In some embodiments the generated non-responsive encoded communication may not provide an answer to a financial query; however, it may appear to move the conversation forwards. In some embodiments, the generated non-responsive encoded communication may be preset by the user and stored as a user preference. In some embodiments, the generated non-responsive encoded communication may be randomly generated by the natural language based model.

Generating the financial query as discussed in relation to step 205 may include matching the user designated query to an associated financial query stored in the database 107-A. Example financial queries may include a balance query, a transaction status query, a credit score query, a card status query, a rewards query, a loan status query, a credit limit query, and the like. Once the associated financial query is determined, the financial query may be provided to a query response module 121.

The query response module 121 may determine a response to the financial query at step 207. For example, the query response module 121 may interface with user financial data 113 stored on database 107-B corresponding to a database of a financial institution such as a bank, credit card company, loan servicer, and the like. In some embodiments, retrieving user financial data may include retrieving user financial data from one or more financial services databases remote from the server system 103 via a financial information application interface. Alternatively, or additionally, the query response module 121 may interface with user financial data 113 stored on database 107-A.

Accordingly, at step 207 the query response module 121 of the server system 103 may determine a response to the financial query and provide the determined response to the encoded communication module 111.

At step 209, the encoded communication module 111 of the server system 103 may encode the response to the financial query (received from the query response module 121) to generate an encoded responsive communication. An encoded responsive communication may be encoded such that the communication appears to be responsive to the communication received by the server system 103. However, the encoded communication may include an answer to the financial query embedded within it. The determined response to the financial query may be encoded in accordance with one or more user preferences 117 stored in the database 107-A. Encoding the financial query may also involve use of the natural language processing module of the encoded communication module 111.

At step 211 the server system 103 may transmit the generated encoded responsive communication to the user interface 109 for presentation to a user of the user interface 109. Presentation to a user of the user interface 109 may include displaying text on a screen such as a text communication chain. In other embodiments, the server system 103 may provide the user interface 109 with an audio message, an email, a notification, and the like. In some embodiments, a text to audio transformation may occur before the generated encoded responsive communication is provided to the user interface 109.

Figure 3A:
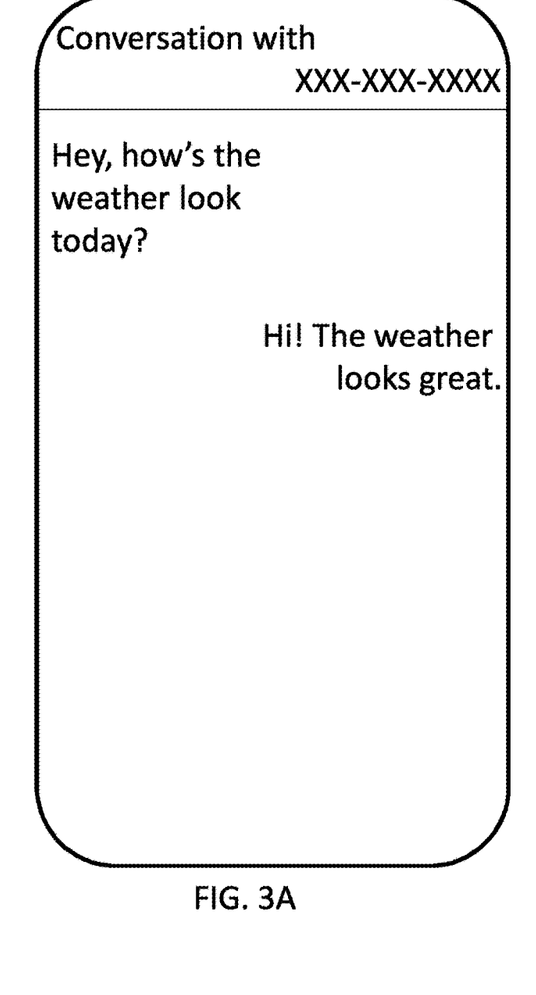
FIG. 3A illustrates a graphical user interface in accordance with an aspect of the present disclosure.
Figure 3B:
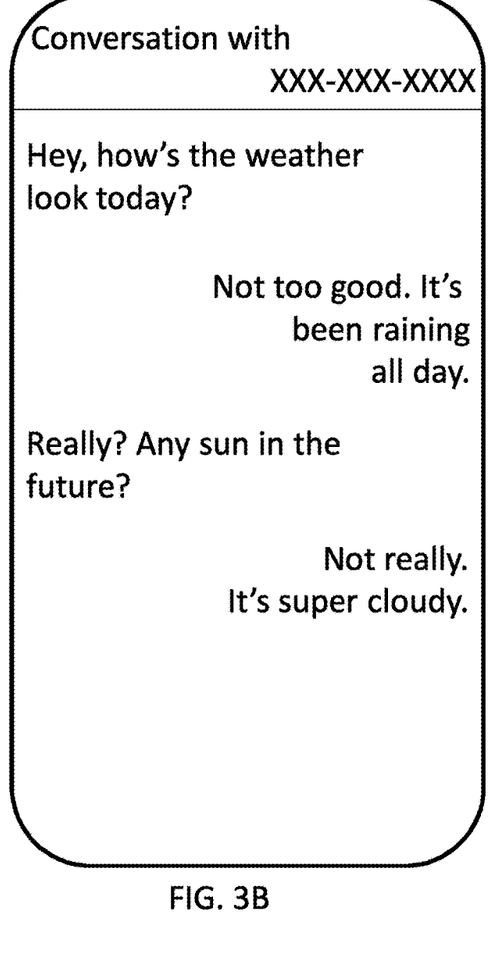
FIG. 3B illustrates a graphical user interface in accordance with an aspect of the present disclosure.
Figure 3C:
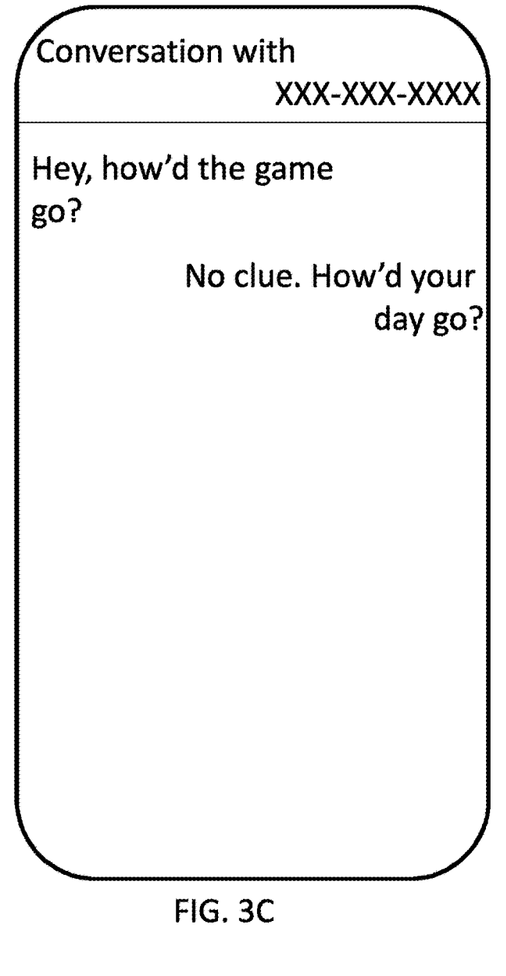
FIG. 3C illustrates a graphical user interface in accordance with an aspect of the present disclosure.

FIGS. 3A-3C illustrate various graphical user interface in accordance with an aspect of the present disclosure.

In particular, FIG. 3A illustrates an example of a graphical user interface text correspondence between a user and a server system. As illustrated in FIG. 3A, the user may text an encoded communication to the server system (e.g., "Hey, how's the weather look today?), and receive a responsive encoded communication (e.g., "Hi! The weather looks great."). While the correspondence may appear irrelevant to an ordinary observer, the responsive encoded communication may provide sensitive information to the user. For example, the encoded communication "Hey, how's the weather look like today?" may correspond to a financial query of "Is my balance greater than $500?" and the responsive encoded communication "Hi! The weather looks great," may correspond to a response indicating that the user's balance is greater than $500.

FIG. 3B illustrates a second example of a graphical user interface text correspondence between a user and a server system. In FIG. 3B, the user texts a series of encoded communications to the server (e.g., "Hey, how's the weather look today?" followed by "Really? Any sun in the future?") and receives a series of responsive encoded communications (e.g., "Not too good. It's been raining all day," followed by "Not really. It's super cloudy."). As discussed above, in some embodiments a series of user designated queries may correspond to a series of related financial queries.

FIG. 3C illustrates a third example of a graphical user interface text correspondence between a user and a server system. In FIG. 3C, the user texts a communication that does not correspond to an encoded communication (e.g., "Hey, how'd the game go?"). In response, the user receives a non-responsive encoded communication (e.g., "No clue. How'd your day go?). As discussed above, the non-responsive encoded communication is configured to be an appropriate response to the received communication, however it does not convey any of the sensitive information, because the received communication does not correspond to the proper encoded communication.

Figure 4:
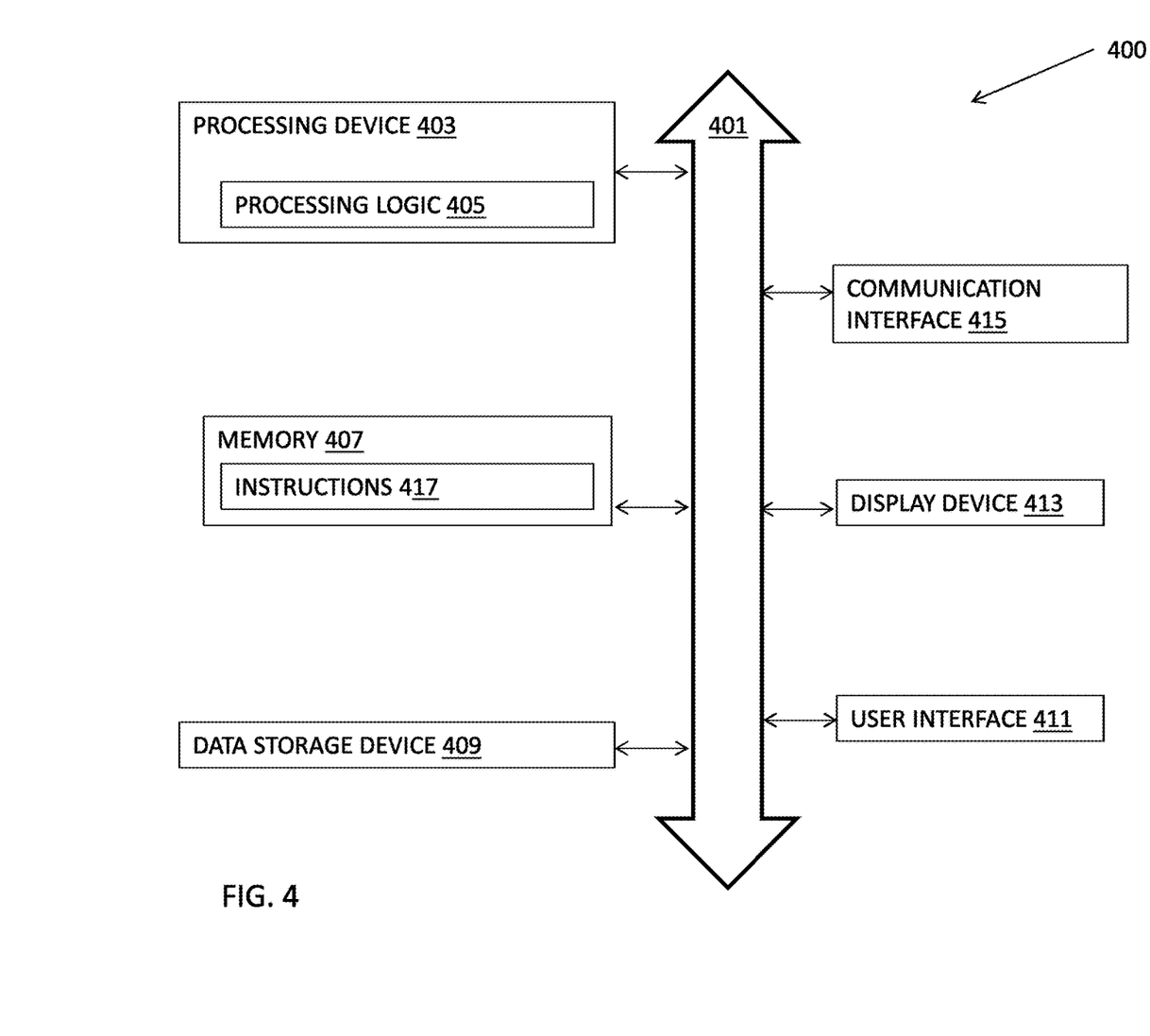
FIG. 4 illustrates a computer system in accordance with an aspect of the present disclosure.

FIG. 4 illustrates a computer system in accordance with an aspect of the present disclosure.

FIG. 4 illustrates a functional block diagram of a machine in the example form of computer system 400, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the user computing device 101 and the server system 103 of FIG. 1 may be implemented by the example machine shown in FIG. 4 (or a combination of two or more of such machines).

Example computer system 400 may include processing device 403, memory 407, data storage device 409 and communication interface 415, which may communicate with each other via data and control bus 401. In some examples, computer system 400 may also include display device 413 and/or user interface 411.

Processing device 403 may include, without being limited to, a microprocessor, a central processing unit, an application specific integrated circuit (ASIC), a field programmable gate array (FPGA), a digital signal processor (DSP) and/or a network processor. Processing device 403 may be configured to execute processing logic 405 for performing the operations described herein. In general, processing device 403 may include any suitable special-purpose processing device specially programmed with processing logic 405 to perform the operations described herein.

Memory 407 may include, for example, without being limited to, at least one of a read-only memory (ROM), a random access memory (RAM), a flash memory, a dynamic RAM (DRAM) and a static RAM (SRAM), storing computer-readable instructions 417 executable by processing device 403. In general, memory 407 may include any suitable non-transitory computer readable storage medium storing computer-readable instructions 417 executable by processing device 403 for performing the operations described herein. Although one memory device 407 is illustrated in FIG. 4, in some examples, computer system 400 may include two or more memory devices (e.g., dynamic memory and static memory).

Computer system 400 may include communication interface device 411, for direct communication with other computers (including wired and/or wireless communication), and/or for communication with network 105 (see FIG. 1). In some examples, computer system 400 may include display device 413 (e.g., a liquid crystal display (LCD), a touch sensitive display, etc.). In some examples, computer system 400 may include user interface 411 (e.g., an alphanumeric input device, a cursor control device, etc.).

In some examples, computer system 400 may include data storage device 409 storing instructions (e.g., software) for performing any one or more of the functions described herein. Data storage device 409 may include any suitable non-transitory computer-readable storage medium, including, without being limited to, solid-state memories, optical media and magnetic media.

In some embodiments, the systems and methods for encoded communications may be used by a user to discretely determine their account balance. This may be done without causing the user embarrassment by not having the user open a bank account or let others know that they are checking their balance. By using encoded communications, the user may be able to text a bank to get information. For example, the user may text "What's the weather like where you are?" To which the user may receive an answer "It's raining all day" if the user's balance is less than $100, "It's getting cloudy" if the user's balance is between $100.01 and $250, and "It looks sunny right now," if the user's balance is $250.01 and higher. Accordingly, the user may receive the benefit of being able to make informed financial decisions (e.g., whether the user should forego ordering a pricier entrée) in crowded situations (e.g., restaurant, bar) without others knowing.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The invention claimed is:

1. A method comprising:
receiving, by an encoded communication module of a server system, a text-based communication from a user interface, wherein the encoded communication module further comprises an artificial intelligence based natural language processing module, wherein the artificial intelligence based natural language processing module is trained on user queries;
determining, by the encoded communication module, whether the received natural language text-based communication is an encoded communication, wherein the encoded communication comprises a communication between a user of the user device and the server system that is coded to be understandable by each of the user and the server system and not understandable by others;
generating, by the artificial intelligence based natural language processing module of the encoded communication module, a financial query based on the natural language text-based communication, when it is determined that the received natural language text-based communication is an encoded communication and providing the financial query to a query response module;
determining, by the query response module, a response to the financial query and providing the determined response to the encoded communication module;

encoding, by the encoded communication module, the response to the financial query to generate an encoded responsive communication, wherein the encoded responsive communication includes natural language; and transmitting, by the server system, the generated encoded responsive communication to the user interface for presentation to a user of the user interface.

2. The method of claim 1, wherein determining whether the received natural language text-based communication is an encoded communication further comprises:
   determining a semantic representation of the received natural language text-based communication; and
   matching the semantic representation to at least one user designated query stored in a database coupled to the server system.

3. The method of claim 2, wherein generating the financial query further comprises matching the at least one user designated query to an associated financial query stored in the database.

4. The method of claim 1, wherein determining the response to the financial query further comprises:
   retrieving user financial data; and
   generating the response to the financial query based on the retrieved user financial data.

5. The method of claim 4, wherein retrieving user financial data further comprises:
   retrieving user financial data from one or more financial services databases remote from the server system via a financial information application interface.

6. The method of claim 1, further comprising:
   generating, by the encoded communication module, a non-responsive encoded communication in response to the received natural language text-based communication from the user interface when it is determined that the received natural language text-based communication is not an encoded communication and does not include a communication between a user of the user device and the server system that is coded to be understandable by each of the user and the server system and not understandable by others.

7. The method of claim 1, further comprising:
   authenticating at least one of the user device and the user of the user device by verification of data provided to the server system against user authentication data stored in a database, wherein the user authentication data further comprises at least one of a password, an encoded password, a phrase, an encoded phrase, a question, an encoded question, a series of communications, an encoded series of communications, a pin, a phone number corresponding to where the communication is received from, an email address corresponding to where the communication is received from, a social media account corresponding to where the communication is received from, and a phone line at which the user communication is received.

8. The method of claim 1, further comprising:
   receiving, by the server system, user preferences from the user interface; and
   storing the user preferences on a database communicatively coupled to the server system, wherein at least one of determining whether the received natural language text-based communication is an encoded communication, generating the financial query, and encoding the response to the financial query is based at least in part on the stored user preferences.

9. The method of claim 1, wherein the financial query further comprises at least one of a balance query, a transaction status query, a credit score query, a card status query, a credit limit query, a loan status query, and a rewards query.

10. A system for encoded communication comprising:
    a processor; and
    non-volatile memory storing computer program code that when executed on the processor causes the processor to execute a process operable to:
    receive a natural language text-based communication from a user interface at an encoded communication module that further comprises an artificial intelligence based natural language processing module trained on user queries;
    determine whether the received natural language text-based communication is an encoded communication, wherein the encoded communication includes a communication between a user of the user device and the server system that is coded to be understandable by each of the user and the server system and not understandable by others;
    decode the encoded communication using the artificial intelligence based natural language processing module to generate a financial query when it is determined that the received natural language text-based communication is an encoded communication;
    retrieve financial data associated with the user;
    determine an answer to the financial query based on the retrieved financial data;
    encode the determined answer to generate an encoded responsive communication such that the meaning of the determined answer is understandable only by each of the user and the server system; and
    transmit the generated encoded responsive communication to the user interface for providing to a user of the user interface.

11. The system of claim 10, wherein when determining whether the received natural language text-based communication is an encoded communication, the processor is further configured to:
    determine a semantic representation of the received natural language text-based communication; and
    match the semantic representation to at least one user designated query stored in a database coupled to the server system.

12. The system of claim 10, wherein when generating the financial query, the processor is further configured to match the at least one user designated query to an associated financial query stored in the database.

13. The system of claim 10, wherein when determining a response to the financial query, the processor is further configured to:
    retrieve user financial data; and
    generate a response to the financial query based on the retrieved user financial data.

14. The system of claim 10, wherein the processor is further configured to:
    generate, by the encoded communication module, a non-responsive encoded communication in response to the received natural language text-based communication from the user interface when it is determined that the received natural language text-based communication is not an encoded communication, and does not include a communication between a user of the user device and the server system that is coded to be understandable by each of the user and the server system and not understandable by others.

15. The system of claim 10, wherein the processor is further configured to:
   authenticate at least one of the user device and the user of the user device by verification of data provided to the processor against user authentication data stored in a database, wherein the user authentication data further comprises at least one of a password, an encoded password, a phrase, an encoded phrase, a question, an encoded question, a series of communications, an encoded series of communications, a pin, a phone number corresponding to where the communication is received from, an email address that the communication is received from, a social media account that the communication is received from, and a phone line at which the communication is received.

16. The system of claim 10, wherein the user interface is configured to receive from and transmit to the processor, at least one of text based and audio based communications.

17. The system of claim 10, wherein the user interface is configured to transmit user preferences to the processor, and the processor is further configured to:
   receive the transmitted user preferences, and
   store the user preferences on a database communicatively coupled to the server system, wherein at least one of determines whether the received natural language text-based communication is an encoded communication, generates the financial query, and encodes the response to the financial query is based at least in part on the stored user preferences.

18. The system of claim 10, wherein the financial query further comprises at least one of a balance query, a transaction status query, a credit score query, a card status query, a credit limit query, a loan status query, and a rewards query.

19. A user device comprising:
   a display;
   an input device;
   a processor in communication with the display and the input device; and
   a non-transitory memory in communication with the processor, the memory storing instructions that, when executed by the processor, cause the processor to perform processing comprising:
   sending a natural language text-based communication from a user of the user device to a server system communicatively coupled with the user device, wherein the text-based communication is associated with a financial query and encoded to be understandable by each of the user and the server system and not understandable by others;
   receiving, from the server system, a natural language responsive communication from the user interface responsive to the natural language text-based communication, wherein the responsive communication is associated with an answer to the financial query and generated using an artificial intelligence based natural language processing module trained on user queries, wherein the responsive communication is configured to be understandable by each of the user and the server system and not understandable by others; and
   displaying on the display of the user device, the responsive communication.

20. The user device of claim 19, further configured to:
   display on the display of the user device, one or more user preference prompts related to user preferences;
   receive user preferences from the input device responsive to the displayed one or more user preference prompts; and
   transmit by the user preferences to a database communicatively coupled to the server system,
   wherein the responsive communication is further generated at least in part based on the user preferences.

* * * * *